Dec. 30, 1930.  A. ROHRMANN ET AL  1,787,171

CULINARY MEANS

Filed Jan. 21, 1929

INVENTORS
Alfred Rohrmann
Hellmuth Schmidt
BY M. C. Frank
ATTORNEY.

Patented Dec. 30, 1930

1,787,171

UNITED STATES PATENT OFFICE

ALFRED ROHRMANN, OF OAKLAND, AND HELLMUTH SCHMIDT, OF BERKELEY, CALIFORNIA

CULINARY MEANS

Application filed January 21, 1929. Serial No. 333,864.

The invention relates to an improved method and means for effecting a cooking of food.

An object of the invention is to provide an improved means for cooking food whereby the food may be cooked by the application of cooking heat simultaneously at the top and bottom surfaces of the food, thereby appreciably shortening the required time for cooking food and producing a product of superior palatability and digestibility.

A further object of the invention is to provide a utensil of the character described which is arranged to utilize heat from a single source, as a stove cooking-top or a hot-plate, in carrying out the aforesaid method.

The invention possesses other objects and features of advantage, some of which, with the foregoing, will be set forth in the following description of a preferred form of the invention which is illustrated in the accompanying drawings, in which, Figure 1 is a side view of a utensil embodying the invention.

Figure 1:
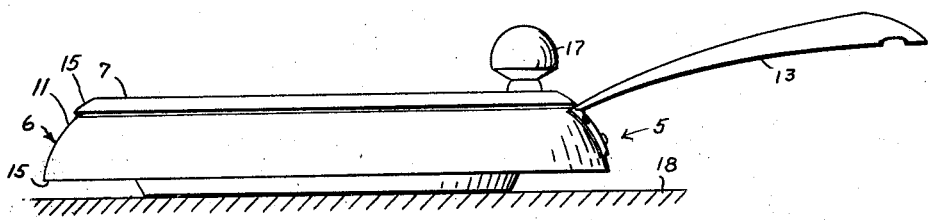
Figure 2:
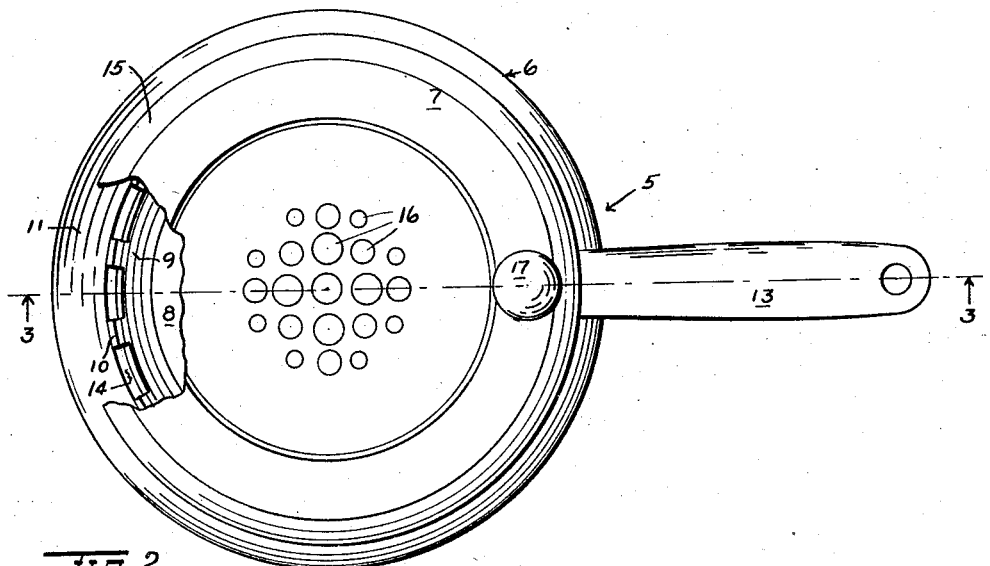
Figure 2 is a plan view of the utensil, a portion of the structure being broken away to disclose certain elements thereof.
Figure 3:
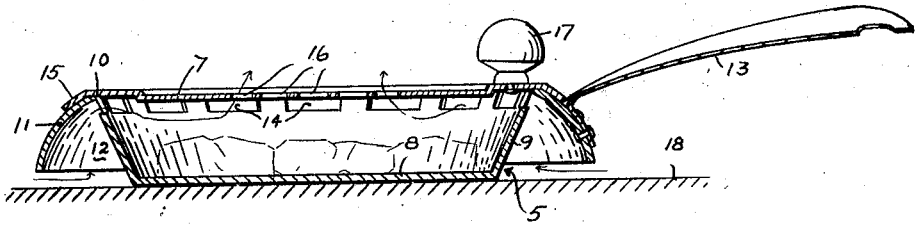
Figure 3 is a sectional elevation in the line 3—3 in Figure 2.

In cooking foods by a direct application of heat at the bottom of a cooking vessel, the major part of the cooking process occurs toward the bottom of the food which must be stirred or turned over for completing the cooking thereof. This condition is particularly true in the case of foods which are cooked without immersion in a liquid, as in frying, for in the latter case no distribution of heat by liquid convection occurs, hence the necessity and common practice of turning over frying food articles during the cooking thereof. In accordance with the present method, means are provided whereby cooking heat is directed simultaneously against both the top and bottom surfaces of food to be cooked whereby the cooking process is speeded up and the food is not given a chance to dry out at the upper side. Food cooked in accordance with this principle is decidedly more palatable and more digestible, and differs so markedly from food prepared by the frying methods heretofore used as to constitute, in effect, a new food product. Thus eggs fried by the novel process of the present invention are found to be uniformly soft and palatable, and meats cooked by the process are tender and tasty through being cooked in their own juices. It is noted that the use of a cover on an ordinary frying pan, while hastening the cooking, effects a parboiling of the upper surface, which method of cooking is usually detrimental both as to palatability and digestibility; by the present method, water vapor escaping from the food is immediately carried away so that parboiling cannot occur.

Referring now to the disclosed means for carrying out the aforesaid method, it is seen that the utensil 5 of our invention essentially comprises a metallic pan member 6 and a cover member 7. The pan 6 is herewith particularly disclosed as circular, said pan comprising a bottom 8 from which a continuous wall 9 extends obliquely upwardly to a rim 10 defining a plane parallel to the pan bottom. Extending outwardly and downwardly from the rim 10 is a hood element 11, which element is seen to cooperate with the adjacent pan wall portion to define an annular space 12 around the pan. Preferably, and as is particularly shown, the inner wall of the element 11 is arcuately bowed when viewed in a vertical section taken transversely therethrough whereby a sharp angle is avoided at the juncture of the hood 11 and wall 9. The free edge of the hood 11 is seen to define a plane slightly spaced above, and parallel to, that of the pan bottom. The pan is preferably provided with a handle 13, said handle being conveniently fixed to the hood element 11, as shown.

Perforations 14 are provided in the pan wall 9, said perforations being evenly distributed along the top edge of the wall and around the rim 10. As shown, the perforations 14 are generally rectangular and terminate in the plane of the rim; in this manner, cooked food articles may be slid out of the pan without catching and the perforations are high enough to permit the disposal of liquids in the pan and prevent the escape of such liquids through them.

The cover 7, it will now be noted, is provided with an outer edge portion 15 shaped for effecting a centered fit thereof over the pan rim 10. The inner cover portion is seen to be provided with a plurality of perforations 16 located centrally of the cover and grouped about the center of the cover. A knob 17 is provided on the cover for handling the same; as shown, the knob is mounted adjacent the cover edge portion 15.

As is usual with frying pans and the like, the present utensil and its contents are arranged to be heated from below, either by the direct application of heat thereto from a heat source or by its disposal over a heat radiating surface; as shown, the utensil is supportedly mounted on a hot-plate surface 18, said surface being arranged to be heated by a suitable source of heat (not shown).

With the utensil disposed on the heated surface 18, the heated air and vapors rising from the pan and food are permitted to escape through the cover perforations 16 by reason of the permitted inflow of air through the pan wall perforations 14 whereby fresh and relatively dry air is received from the annular hood space 12. But the air in and adjacent said space is subjected to the heat of the surface 18 adjacent the pan, and hence is pre-heated. It will now be clear that the temperature acquired by the air entering the hood space and pan will vary inversely with the flow rate of said air; in accordance with the present invention, said flow rate must be such that the air delivered within the pan from the hood space will have acquired a desired food cooking temperature.

For the best results, a definite and relatively slow flow rate of the preheated air through the cooking cavity of the utensil is therefore necessary, and the required control is preferably effected by suitably retarding said air flow. Preferably, and as shown, the rate of air flow is controlled at the exit perforations 16 in the cover by providing for a reduced passage thereat which is effective to choke down the circulating air stream to retard the same as required. A group of perforations 16 is provided, rather than a single opening, for the purpose of spreading the air stream at its point of exit whereby a more even distribution of the heat to the food is assured. While a damper-like arrangement might be provided at the perforations 16 for varying the effective passage thereat, it has been found that for a given utensil, there is generally one best size for said openings, hence no variable control has been disclosed in the present showing. The effective section of the passage provided by the wall perforations 14 is, of course, greater than that of the cover perforations 16, when, as in the present instance, the flow rate is primarily controlled at the latter perforations.

It will now be obvious that the utensil specifically disclosed herein is particularly adapted for carrying out the novel method of our invention and to produce fried food products of maximum palatability and digestibility. Certain structural changes are, of course, possible in such a utensil, the prime requisite being the collection and discharge of preheated air over the top surface of the food. The preheating of the air by means of heat which is normally wasted is also seen to be an important element of our disclosure, it being noted that the presence of heated air in the hood space at the outer side of the pan wall operates to prevent the usual heat radiation losses from such walls.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative, and that such changes may be made, when desired, as fall within the scope of the appended claims.

Having thus described our invention, we claim as new and desire to secure by Letters Patent of the United States the following:

1. A cooking utensil comprising a vessel having a continuous side wall terminating in a rim defining a top opening for the vessel cavity, a hood member extending outwardly and downwardly from the wall at said rim to define an annular space encircling the vessel, a passage connecting said space and said cavity through said wall, and a cover member engaging said rim and having a central vent passage therethrough, no portion of said cover member extending above the plane of its rim engaging edge portion.

2. A cooking utensil comprising a vessel having a continuous side wall terminating in a rim defining a top opening for the vessel cavity, a hood member extending outwardly and downwardly from the wall at said rim to define an annular space encircling the vessel, a passage connecting said space and said cavity through said wall, and a cover member engaging said rim and having a passage therethrough, said wall passage being of greater cross-section than said cover passage whereby to produce a retarded exit of gaseous matter from the cavity.

3. A cooking utensil comprising a vessel having a rim defining a top opening, air inlet openings in the vessel walls adjacent said rim, and a cover member disposable on said rim as a closure for the vessel and centrally perforated to provide an exit passage from the vessel cavity, the perforated portion of said cover member being depressed below the plane of said rim.

In testimony whereof, we affix our signatures.

ALFRED ROHRMANN.
HELLMUTH SCHMIDT.